US008057580B2

(12) United States Patent
Poorte et al.

(10) Patent No.: US 8,057,580 B2
(45) Date of Patent: Nov. 15, 2011

(54) METHOD OF COOLING A MULTIPHASE WELL EFFLUENT STREAM

(75) Inventors: Edwin Poorte, Nesbru (NO); Ola Skrøvseth, Østerås (NO); Asbjørn Eriksen, Skallestad (NO); Karl Olav Haram, Oslo (NO); Julian Van Der Merwe, Leidschendam (NL)

(73) Assignee: Shell Oil Company, Houston, TX (US)

( * ) Notice: Subject to any disclaimer, the term of this patent is extended or adjusted under 35 U.S.C. 154(b) by 346 days.

(21) Appl. No.: 12/307,710

(22) PCT Filed: Jul. 2, 2007

(86) PCT No.: PCT/NO2007/000248

§ 371 (c)(1), (2), (4) Date: Jul. 6, 2009

(87) PCT Pub. No.: WO2008/004882

PCT Pub. Date: Jan. 10, 2008

(65) Prior Publication Data

US 2010/0155970 A1 Jun. 24, 2010

(30) Foreign Application Priority Data

Jul. 7, 2006 (NO) .................................... 20063164

(51) Int. Cl.
*B01D 19/00* (2006.01)

(52) U.S. Cl. ................. 95/254; 95/258; 96/155; 96/157

(58) Field of Classification Search .................... 95/241, 95/247, 254, 258, 266; 96/155, 157, 193
See application file for complete search history.

(56) References Cited

U.S. PATENT DOCUMENTS 7,063,161 B2 * 6/2006 Butler et al. ................. 166/372

FOREIGN PATENT DOCUMENTS

| | | |
|---|---|---|
| NO | 319654 | 9/2005 |
| WO | WO03033870 | 4/2003 |
| WO | WO03035335 | 5/2003 |
| WO | WO2005026497 | 3/2005 |
| WO | WO2005040670 | 5/2005 |

OTHER PUBLICATIONS

International Search Report dated Oct. 19, 2007 (PCT/NO2007/000248).

* cited by examiner

*Primary Examiner* — Robert A Hopkins

(57) ABSTRACT

A method of processing a multiphase well effluent mixture comprises: transferring the multiphase well effluent mixture (G+L) via a multiphase well effluent flowline (3, 23) to a gas liquid separator (5, 24) in which the multiphase well effluent mixture is separated into substantially gaseous and liquid fractions; transferring the substantially liquid fraction L into a liquid flowline (7, 25) in which a liquid pump (8, 29) is arranged; transferring the substantially gaseous fraction into a gas flowline (6, 26) in which a gas compressor (10, 30) is arranged; protecting the gas compressor (10, 30) against pressure and/or liquid surges by recirculating a recycled gas stream ($G_{hot}$) via a gas recycling conduit (14, 44) through the gas compressor in response to detection of a pressure and/or liquid surge in the multiphase well effluent mixture; cooling the recycled gas stream by injecting cooled recycled liquid ($L_{cold}$) from the liquid flowline (7, 25) into the recycled gas stream ($G_{hot}$) which recycled liquid is cooled in a heat exchanger (9, 49), which may be a compact liquid-liquid heat exchanger that is about ten times smaller than a bulky gas-liquid heat exchanger that could be arranged in the gas recycling conduit (14, 44).

9 Claims, 2 Drawing Sheets

METHOD OF COOLING A MULTIPHASE WELL EFFLUENT STREAM

The present application claims priority of Norwegian Patent Application No. 20063164 filed 7 Jul. 2006.

BACKGROUND OF THE INVENTION

The invention relates to a method of processing a multiphase well effluent mixture.

Such a method is known from OTC paper 17399 "Subsea Gas Compression—Challenges and Solutions" presented by R. Fantoft at the Offshore Technology Conference held in Houston, USA on 2-5 May 2005 and from International patent applications WO03/033870 WO03/035335 and WO2005/026497. The method known from WO2005/026497 comprises:

- transferring the multiphase well effluent mixture via a multiphase well effluent flowline to a gas liquid separator in which the multiphase well effluent mixture is separated into substantially gaseous and liquid fractions;
- transferring the substantially liquid fraction into a liquid flowline in which a liquid pump is arranged;
- transferring the substantially gaseous fraction into a gas flowline in which a gas compressor is arranged;
- protecting the gas compressor against liquid surges by recirculating a recycled gas stream via a gas recycling conduit through the gas compressor in response to detection of a liquid surge in the multiphase well effluent mixture.

In the method known from WO2005/026497 the recycled gas is heated up each time when it is compressed in the gas compressor and subsequently cooled in a heat exchanger arranged in the gas recycling conduit. Such a heat exchanger is a large piece of equipment because heat conductivity of the recycled gas is small, so that a large heat exchanging surface is required to cool the recycled gas stream to such a temperature that overheating of the gas compressor is prevented.

In the known method liquid in the liquid flowline may be cooled and recycled into the multiphase well effluent flowline, but in case the well effluents are substantially liquid, then the gas compressor may be substantially solely fed with recycled gas, so that the influx of substantially liquid well effluents and of recycled cooled liquid is inhibited.

It is an object of the present invention to provide an improved method of processing a multiphase well effluent mixture, wherein the processing involves the use of a compact fluid separation and pressure boosting assembly. It is a further object of the present invention to provide an improved method of processing a multiphase well effluent mixture in which a gas compressor is protected against pressure and/or liquid surges and overheating by using a gas recirculating conduit, in which the need for a bulky gas-liquid heat exchanger in the gas recycling conduit is obviated.

SUMMARY OF THE INVENTION

In accordance with the invention there is provided a method of processing and separating a multiphase well effluent mixture, the method comprising:

- transferring the multiphase well effluent mixture via a multiphase well effluent flowline to a gas liquid separator in which the multiphase well effluent mixture is separated into substantially gaseous and liquid fractions;
- transferring the substantially liquid fraction into a liquid flowline in which a liquid pump is arranged;

- transferring the substantially gaseous fraction into a gas flowline in which a gas compressor is arranged;
- protecting the gas compressor against pressure and/or liquid surges by recirculating a recycled gas stream via a gas recycling conduit through the gas compressor in response to detection of surge conditions;
- cooling the recycled gas Stream by injecting cooled recycled liquid from the liquid flowline into the recycled gas stream, which recycled liquid is cooled in a heat exchanger.

The gas liquid separator may be submerged in (sea)water. The heat exchanger may be cooled by ambient (sea)water or another suitable cooling liquid.

The recycled liquid may be cooled in a heat exchanger, which may be arranged in the liquid flowline, or in the liquid recycling conduit.

The recycled liquid may be injected into the gas recycling conduit, the multiphase well effluent conduit or into the gas-liquid separator.

An advantage of the injection of cold liquid into the recycled gas stream in accordance with the invention is that the injected cold liquid may be cooled in a compact liquid-liquid heat exchanger, which may be about ten times smaller than the gas-liquid heat exchanger known from WO2005/026497 to directly cool the recycled gas stream.

These and other features, embodiments and advantages of the method according to the invention are described in the accompanying claims, abstract and the following detailed description of preferred embodiments in which reference is made to the accompanying drawings.

DETAILED DESCRIPTION OF PREFERRED EMBODIMENTS

Figure 1:
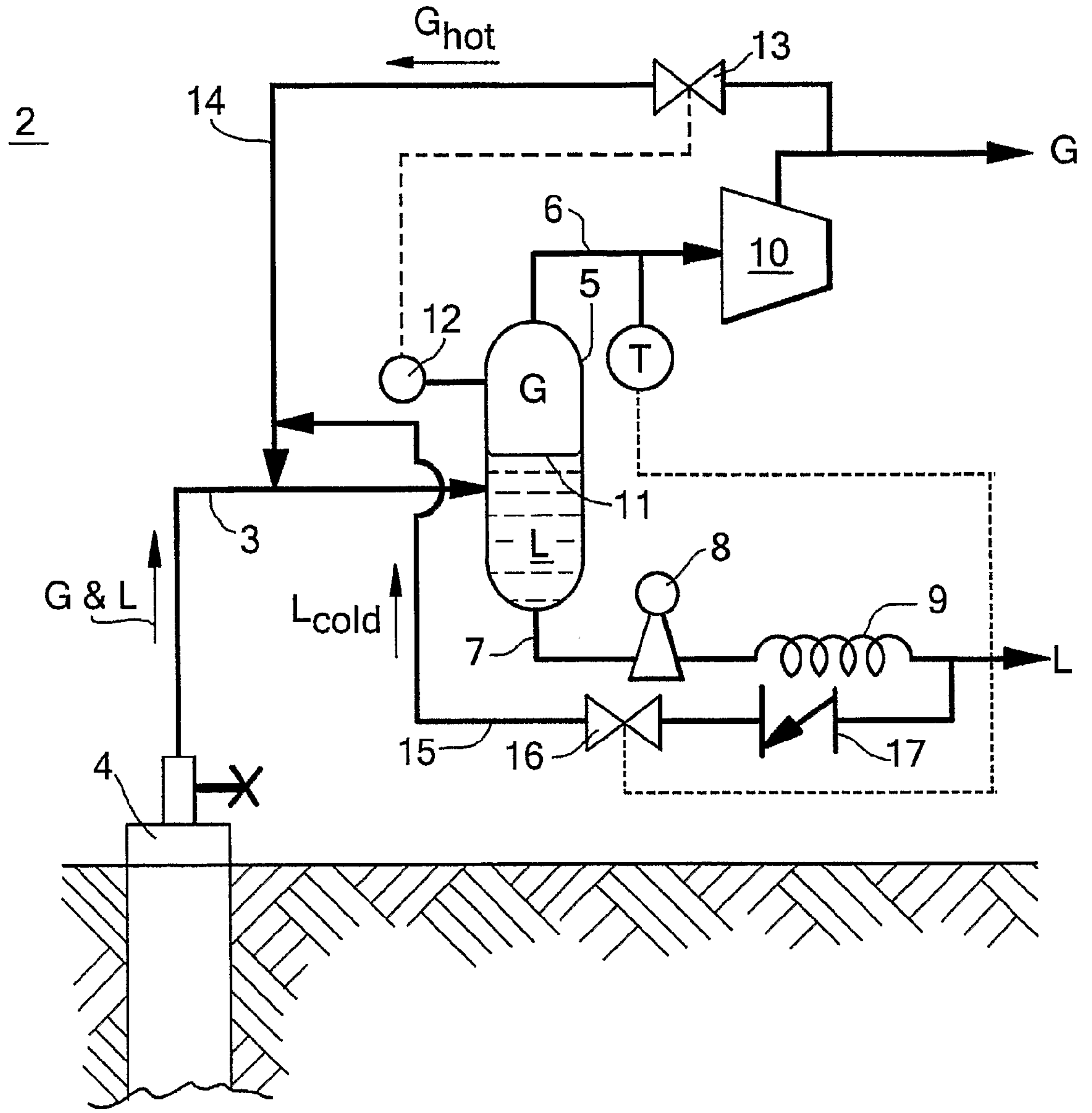
FIG. 1 depicts a multiphase well effluent processing: assembly for use in the method according to the invention.

FIG. 1 depicts a well effluent processing assembly, which is suitable to be installed on the bottom 1 of the sea 2.

The assembly comprises a subsea multiphase well effluent flowline 3, which is connected to one or more natural gas, condensate, water and/or crude oil production wells and which discharges the multiphase gas and liquid containing well effluent stream G+L into a gas liquid separating vessel 5 in which the multiphase fluid mixture is separated into a substantially gaseous fraction G, which is discharged into a gas flowline 6 that is connected to the upper side of the vessel 5 and a substantially liquid fraction L, which is discharged into a liquid flowline 7 that is connected to the lower side of the vessel 5.

The substantially liquid fraction L is pumped by a pump 8 through the liquid flowline 7 in which a compact heat exchanger 9 is arranged, in which the liquid stream is cooled by ambient seawater.

The substantially gaseous fraction G is compressed in a gas compressor 10, which is arranged in the gas flowline 6.

In order to keep the compressor, inside its normal operating envelope, the gas flow into the compressor must match its speed; specifically under low inflow conditions, the compressor can experience surge, which must be avoided as it can lead to permanent mechanical damage of the compressor. Low inflow is avoided by recycling warm gas from the compressor discharge, using gas recycling conduit 14.

Furthermore, the subsea well 4 may produce well effluents in a slug type flow regime, such that subsequent gas and liquid slugs are produced, which may be so large that the volume of the gas liquid separator 5 is insufficient to absorb these slugs. In such case the liquid level 11 in the separator 5 will rise and may reach the entrance of the gas flowline 6 and may cause substantial damage to the gas compressor 10, which is generally not suitable to compress liquids. In order to protect the gas compressor 10 against liquid surges a liquid level sensor 12 is arranged at a suitable location in the separator vessel 5, which sensor is connected to an anti-surge valve 13 in a gas recycling conduit 14, such that the valve 13 opens if the liquid level reaches the liquid level sensor 12 and gas is recycled from the flowline 6 downstream of the gas compressor 10 via the gas recycling conduit 14 to the multiphase well effluent flowline 3.

When the gas stream G is compressed by the gas compressor 10 then the temperature of the compressed gas is increased due to friction and adiabatic compression. Therefore the temperature of the recycled gas will increase gradually and the recycled gas stream $G_{hot}$ may become so hot that it may cause damage to the gas compressor 10. To prevent the recycled gas stream $G_{hot}$ from becoming too hot, a fraction of liquid, which is cooled in the heat exchanger 9 is injected via a liquid recycling conduit 15 into the gas recycling conduit 14 if a thermometer T in the gas flowline 6 indicates that the temperature of the gas fed into the gas compressor 10 exceeds a predetermined value. The thermometer 10 is connected to a valve 16 in the liquid recycling conduit 15 such that the valve 16 progressively opens in response to an increase of the temperature measured by the thermometer T. The liquid recycle conduit 15 is furthermore provided with a one way check valve 17, which prevents gas to flow from the gas and liquid recycling conduits 14 and 15 into the liquid flowline 7.

An advantage of injecting cold liquid into the recycled gas stream $G_{hot}$ is that the heat exchanger 9 is a liquid-liquid heat exchanger, which may be about ten times smaller than a conventional gas-liquid heat exchanger that may be used to cool the recycled gas stream $G_{hot}$ flowing through the gas recycle conduit 14 with seawater. Such a conventional gas-liquid heat exchanger is disclosed in International patent application WO 2005/026497.

It will be understood that the liquid-liquid heat exchanger 9 may be arranged in the liquid flowline 7 either upstream or downstream of the pump 8 and that the heat exchanger 9 may be arranged in the liquid recycling conduit 15.

It will furthermore be understood that the recycled cooled liquid $L_{cold}$ may be injected into the gas recycling conduit 14 as shown in FIG. 1, or may alternatively be injected into the multiphase well effluent conduit 3 or into the gas liquid separating vessel 5. In all cases good heat transfer between cold liquid and warm gas is ensured by a large interfacial area between the gaseous and the liquid phases. The cooling of the gas occurs due to flashing of liquid into vapour (associated with latent heat) as well as due to an increase in temperature of the liquid.

Figure 2:
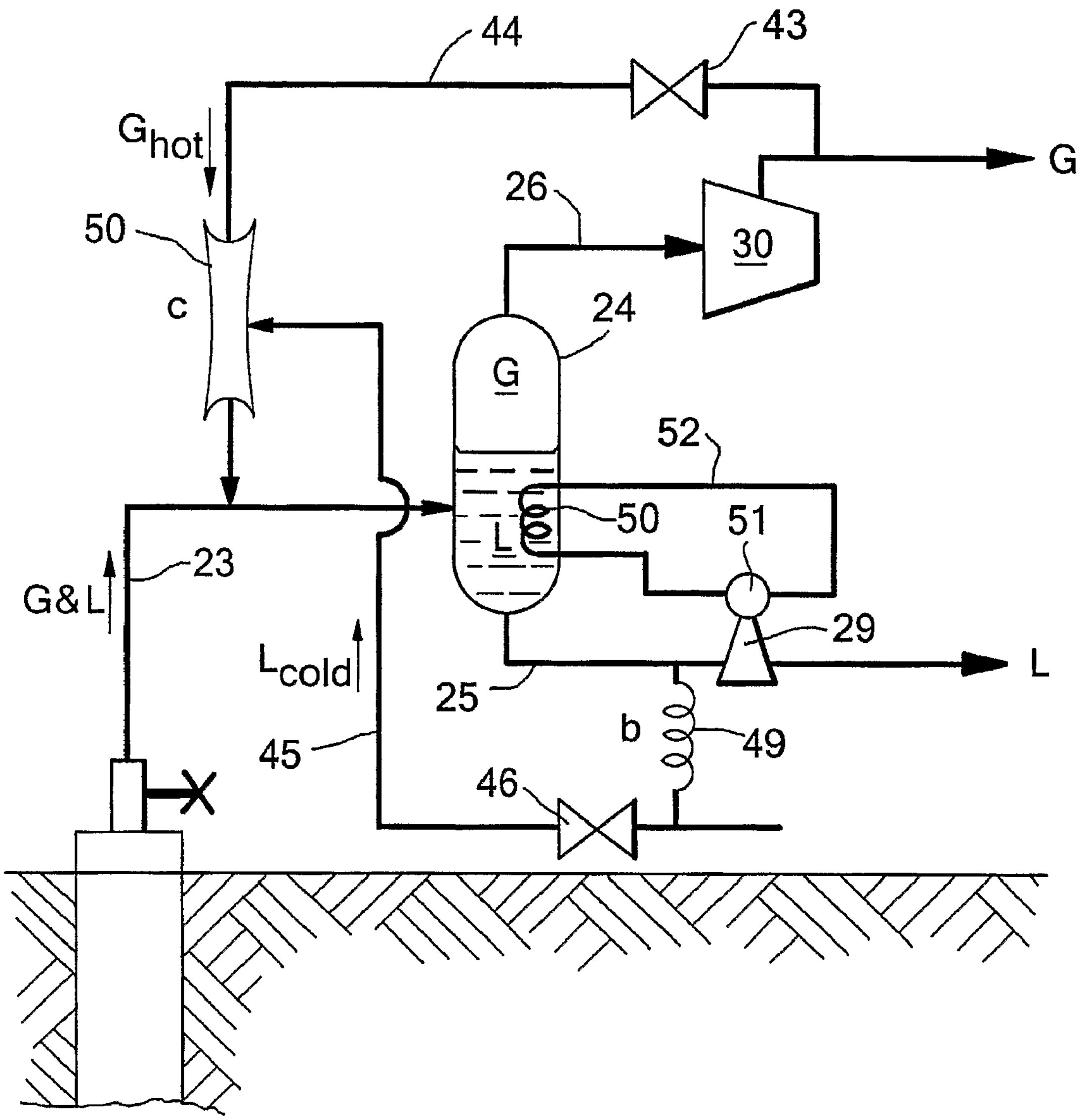
FIG. 2 depicts an alternative embodiment of a multiphase well effluent processing assembly for use in the method according to the invention.

FIG. 2 depicts an alternative embodiment of the well effluent processing assembly according to the invention, wherein the multiphase well effluents G+L are transported via a multiphase well effluent flowline 23 into a gas-liquid separating vessel 24 from which the separated gas and liquid streams G and L are discharged via liquid and gas flowlines 25 and 26 in which a liquid pump 28 and a gas compressor 30 are arranged.

To protect the gas compressor 30 against pressure and/or liquid surges gas may be recycled via gas recycling conduit 44, in which an anti-surge valve 43 is arranged, from the gas flowline 26 at a location downstream of the gas compressor 30 into the multiphase well effluent flowline 23.

To protect the gas compressor 30 against overheating by the recycled hot gas stream $G_{hot}$ a flux of cold liquid $L_{cold}$ is injected into to the gas recycling conduit 44 via a liquid recycling conduit 45 in which a flow control valve 46 and a liquid-liquid heat exchanger 49 are arranged.

To control the gas liquid ratio of the recycled fluid stream that is injected into the multiphase well effluent conduit 23 a jet pump 50 is arranged in the gas recycling conduit 44, which jet pump 50 sucks up a predetermined amount of cold liquid $L_{cold}$ into the recycled gas stream $G_{hot}$, such that the flow control valve 46 may be obsolete.

In cases where the well effluents contain little or no liquids, some suitable liquid may be added to the system; for example a liquid that is used for other purposes in the system (e.g. a liquid chemical to avoid hydrate formation, such as monoethylene glycol or methanol).

There are several known ways to detect surge and the onset of a surge in a compressor. These typically involve sensors to measure volumetric flow rate upstream the compressor as well as sensors for measuring pressure upstream and downstream of the compressor. By comparing the current actual volumetric flow and pressure ratio of the compressor with the theoretical volumetric flow at which surge occurs at that pressure ratio, it is determined how large the margin in flowrate is to the surge control line. If the margin becomes smaller than a predefined value, the anti surge valve is opened. It will be understood that any such known surge detection system and accompanying instrumentation can be employed in the method according to the present invention.

FIG. 2 further depicts that a heating coil 50 may be arranged in the liquid filled lower section of the gas liquid separating vessel 25, which heats the liquid to such a temperature that hydrates will melt and will not obstruct liquid flow to the liquid outlet 25. The heating coil 50 may be heated by circulating cooling liquid of the electric motor 51 of the liquid pump 29 through cooling liquid that is heated by the motor 51 via heated cooling liquid circulation conduits 52 through the heating coil 50. The heating coil 50 may extend into the gas filled section of the separating vessel 25.

That which is claimed is:

1. A method of processing and separating a multiphase well effluent mixture, the method comprising:

transferring the multiphase well effluent mixture via a multiphase well effluent flowline to a gas liquid separator in which the multiphase well effluent mixture is separated into substantially gaseous and liquid fractions;

transferring the substantially liquid fraction into a liquid flowline in which a liquid pump is arranged;

transferring the substantially gaseous fraction into a gas flowline in which a gas compressor is arranged;

protecting the gas compressor against pressure and/or liquid surges by recirculating a recycled gas stream via a gas recycling conduit through the gas compressor in response to detection of a pressure and/or liquid surge in the compressor;

cooling the recycled gas stream by injecting cooled recycled liquid into the recycled gas stream, which recycled liquid is cooled in a heat exchanger.

2. The method of claim 1, wherein the gas liquid separator is located near the bottom of a body of water and the heat exchanger is water cooled.

3. The method of claim 1, wherein the recycled liquid is cooled in a heat exchanger, which is arranged in the liquid flowline.

4. The method of claim 1, wherein the recycled liquid is cooled in a heat exchanger, which is arranged in the liquid recycling conduit.

5. The method of claim 1, wherein the recycled liquid is injected into the gas recycling conduit.

6. The method of claim 1, wherein the recycled liquid is injected into a jet pump arranged in the gas recycling conduit.

7. The method of claim 1, wherein the recycled liquid is injected into the multiphase well effluent flowline at a location between the mouth of the gas recycling conduit and the inlet of the gas liquid separator.

8. The method of claim 1, wherein a pressure and/or liquid surge in the compressor is detected by one or more pressure and/or liquid surge detectors upstream and/or downstream of the compressor, which detectors induce a surge protection valve within the gas recycling conduit to open automatically in response to detection of a surge and/or an onset of a surge.

9. The method of claim 8, wherein a thermometer is arranged in the recycled gas stream and a valve is arranged in the liquid recycling conduit, which valve is opened, or further opened if the temperature of the recycled gas stream exceeds a predetermined value.

* * * * *